United States Patent
Calisoglu et al.

(10) Patent No.: US 9,205,875 B2
(45) Date of Patent: Dec. 8, 2015

(54) MOTOR VEHICLE BODY

(71) Applicant: GM GLOBAL TECHNOLOGY OPERATIONS LLC, Detroit, MI (US)

(72) Inventors: Hayrullah Calisoglu, Ruesselsheim (DE); Wolfgang Rasel, Rudeheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/469,425

(22) Filed: Aug. 26, 2014

(65) Prior Publication Data

US 2015/0054298 A1 Feb. 26, 2015

(30) Foreign Application Priority Data

Aug. 26, 2013 (DE) ................. 20 2013 007 579 U

(51) Int. Cl.
*B62D 27/02* (2006.01)
*F16B 5/02* (2006.01)
*B62D 27/06* (2006.01)
*B62D 29/00* (2006.01)

(52) U.S. Cl.
CPC ............. *B62D 27/02* (2013.01); *B62D 27/065* (2013.01); *B62D 29/001* (2013.01); *F16B 5/0241* (2013.01)

(58) Field of Classification Search
CPC .... B62D 27/02; B62D 29/001; B62D 27/065; F16B 5/0241
USPC .......................................................... 296/29
See application file for complete search history.

(56) References Cited

U.S. PATENT DOCUMENTS

| | | | |
|---|---|---|---|
| 2,404,372 A | 7/1946 | Hallock | |
| 2005/0074276 A1* | 4/2005 | Luetze et al. | 403/14 |
| 2007/0001484 A1* | 1/2007 | Okamoto et al. | 296/193.05 |
| 2011/0008126 A1* | 1/2011 | Schraer | 411/108 |
| 2014/0060791 A1* | 3/2014 | Sun et al. | 165/185 |

FOREIGN PATENT DOCUMENTS

| | | |
|---|---|---|
| DE | 1982732 U | 4/1968 |
| DE | 202006016695 U1 | 12/2006 |
| DE | 102008058970 A1 | 5/2010 |
| DE | 102008061822 A1 | 6/2010 |
| DE | 202010004534 U1 | 7/2010 |
| DE | 102009011546 A1 | 9/2010 |
| EP | 0905425 A2 | 3/1999 |

* cited by examiner

*Primary Examiner* — Jason S Morrow
(74) *Attorney, Agent, or Firm* — Ingrassia Fisher & Lorenz PC

(57) ABSTRACT

A connecting element for a vehicle body substructure and a panel element having different heat expansion coefficients are provided. The connecting unit penetrates an opening in a plate of the substructure. A plate of the paneling element is held with play in the direction of its surface normal is in a groove of the connecting unit. The connecting unit includes a bushing having two parts that are moveable against one another in the direction of the surface normal, between which the other plate is held.

12 Claims, 1 Drawing Sheet

MOTOR VEHICLE BODY

CROSS REFERENCE TO RELATED APPLICATION

This application claims priority to German Patent Application No. 202013007579.1 filed Aug. 26, 2013, which is incorporated herein by reference in its entirety.

TECHNICAL FIELD

The present disclosure relates to a motor vehicle body with a substructure and a paneling element, which are produced from different materials and therefore have different heat expansion coefficients.

BACKGROUND

When paneling elements of plastic are mounted on a metallic substructure, the former have a tendency of expanding substantially more when heated. When a connection between the substructure and paneling element does not have the necessary play in order to permit displacements associated with this different expansion characteristic, the paneling element has a tendency of bending and suffering damage under the effect of heat, for example when it is exposed to the sun.

During drying following the painting, the motor vehicle body is exposed to even higher temperatures than during sun irradiation. In order for a paneling element to survive this also without damage, a freedom of movement relative to the substructure is required which reaches or even exceeds the order of magnitude of the gap width between adjacent paneling elements of the body. Such a large freedom of movement can result in that during the course of time, paneling elements migrate on the motor vehicle body and the gap width between such a paneling element and an adjacent body element visibly changes.

DE 10 2009 011 546 A1 describes a motor vehicle with a substructure and a paneling element of plastic. In this case a sliding element is displaceably received in an elongated hole of the paneling element and a screw extends through the sliding element in order to fix the latter to a substructure. When the dimensions of the elongated hole are large enough in order to be able to exclude the bending of the paneling element even during the drying of the paint, the gap width between the paneling element and an adjacent paneling element of the motor vehicle body can also change during the utilization of the motor vehicle because of repeated temperature changes.

SUMMARY

In accordance with the present disclosure a motor vehicle body is provided which on the one hand the movability of paneling element and substructure against one another can be rendered large enough in order to exclude bending in extreme temperatures and on the other hand excessive migrating of the paneling element relative to the substructure is however prevented.

According to a configuration of the present disclosure, a motor vehicle body is provided with a substructure and a paneling element, which have different heat expansion coefficient. At least one connecting unit penetrates an opening in a plate of the substructure. A plate of the paneling element is held with play in the direction of its surface normal is in a groove of the connecting unit. The connecting unit includes a bushing having two parts that are moveable against one another in the direction of the surface normal, between which the other plate is held. The play between the one plate and the groove of the connecting unit makes possible on the one hand a movability of the one plate relative to the connecting unit in the direction of its surface. So long as the other plate is not clamped between the two parts of the bushing, it, too, is moveable in the direction that is parallel to its surface, and the freedoms of movement of both plates add up, so that differences in size resulting from extreme temperature fluctuations can also be compensated. When after the drying a renewed exposure of the body to very high temperatures need no longer be expected, the two parts of the bushing can be moved against one another in order to clamp and thereby fix the other plate in between. Accordingly, the freedom of movement of the paneling element relative to the substructure can be reduced to a dimension that is appropriate to the requirement, which prevents a displacement of the paneling element relative to an adjacent body element that is noticeable to the naked eye.

The one plate can consist in particular of metal, such as steel or aluminum, and the other of plastic, in particular fiber-reinforced plastic.

The two parts of the bushing can be moved from a provisional position, in which the other plate is held with play in the direction of the surface normal between them, preferentially against a resistance into a definitive position, in which the other plate is clamped between them. Accordingly, the reaching of the provisional position is easily noticeable during the assembly of the motor vehicle body by way of the commencement of the resistance and it is possible with little effort during the assembly of the motor vehicle body to assemble the two parts of the bushing initially in the provisional position, and bring the bushing into the definitive position only after the painting and drying of the body.

In order to further simplify the assembly of the body it is practical when the two parts of the bushing have sleeve portions which telescopically engage into one another.

One of these sleeve portions preferentially has an engagement protrusion while the other one has a groove which is dimensioned in order to receive the engagement protrusion. Preferentially, engagement of the engagement protrusion in the groove marks the provisional position of the sleeve, so that the resistance to the deformation of the sleeve mentioned above can recede during the displacement of the engagement protrusion out of the groove; however it is also conceivable to mark the definitive position through the engagement of an engagement protrusion in a groove.

The two parts of the bushing furthermore include flange portions which are each preferentially located opposite the other plate, between which the other plate is held with play in the provisional position. On at least one of the flange portions, tips facing the other plate can be formed. These tips can establish a positively joined connection between the sleeve and the other plate in that they enter the other plate in the definitive position. The connecting unit can furthermore include a screw, which penetrates the openings of the plates, and a nut. The groove, into which the one plate engages with play, can in particular be limited by a head of the screw and by one of the parts of the sleeve mentioned above.

A shoulder, which penetrates the opening of the one plate in order to maintain the play between the connecting unit and the one plate in particular even when the screw is tightened, is preferentially formed on the head of the screw and abuts one of the parts of the sleeve. At least one of the openings should be an elongated hole. Preferentially, both openings are elongated holes with longitudinal axes that are parallel to one another.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
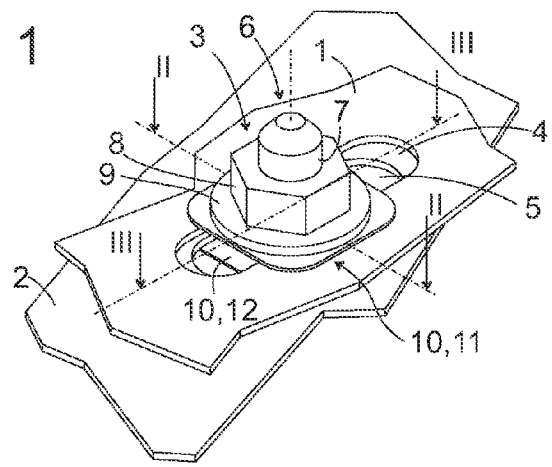
FIG. 1 a perspective view of a connecting unit and of parts of two plates held together by the connecting unit.

FIG. 1 shows in a perspective view fragments of a first plate 1 and of a second plate 2, which are held together by a connecting unit 3, which extends through the elongated holes 4, 5 of the plates 1, 2. The longitudinal axes of the elongated holes 4, 5 are orientated parallel to one another and along the plane designated III-III.

The plate 1 consists of plastic, in particular a fiber-reinforced plastic and is a part of a paneling element of a motor vehicle body, which is not visible on the ready assembled vehicle from the outside. The paneling element can for example be a fender, a door, a flap or the like. The plate 2 by contrast consists of metal, in particular steel plate, and is part of a support structure of the body. It can in particular be part of a side member or a frame component that is fastened to a side member.

The connecting unit 3 in this case includes a screw 6, of which however only the tip of a shaft 7 is visible in FIG. 1, a nut 8, which is screwed onto the shaft 7, a washer 9 and an outer part 11 of a two-part sleeve 10. Of an inner part 12 of the sleeve 10, only a small part is visible through the elongated holes 4, 5.

Figure 2:
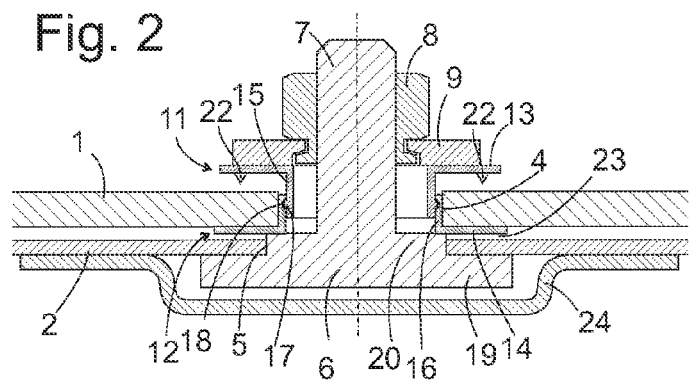
FIG. 2 an axial section through the connecting unit along the plane II-II from FIG. 1 in provisional position.
Figure 3:
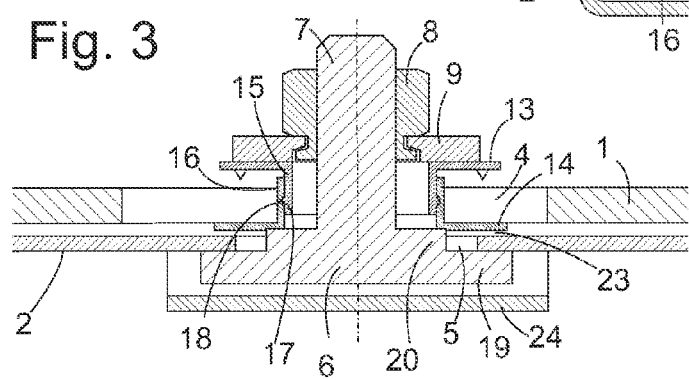
FIG. 3 a section through the connecting unit in provisional position along the plane III-III from FIG. 1.

FIG. 2 shows the flaps 1, 2 and the connecting unit 3 in a section transversely to the elongated holes 4, 5, along the plane II-II from FIG. 1, in a provisional position, and FIG. 3 shows the same connecting unit 3 in section along the plane III-III from FIG. 1. The two parts 11, 12 of the sleeve 10 include, as is visible here, a flange portion 13 and 14 respectively each, which extends in a flat and perpendicular manner to the axis of the screw 6, and a sleeve portion 15 and 16 respectively, which engages in the elongated hole 4 of the plate 1 from opposite directions each. In the section plane of FIG. 2, the sleeve portion 16 fills out the elongated hole 4 with little play; the sleeve portions 15, 16 can have a non-round, in particular rectangular cross section in order to be non-rotatable in the elongated hole 4.

The sleeve portion 15 of the outer part 11 includes an engagement protrusion 17 on its outside, for example in the form of a circumferential rib, which is engaged in a groove 18 on the sleeve portion 16 of the inner part 12. The two parts 11, 12 of the sleeve 10 are slightly clamped between a shoulder 20 formed on the head 19 of the screw 6 and which engages in the elongated hole 5 of the plate 2 and a washer 21 which is anchored on the nut 8 in a positively joined manner and rotatably relative to the same. The shoulder 20 is non-round in cross section, in particular rectangular, in order to hold the screw 6 rotationally fixed. A clip 24 which is fastened on the plate 2 on both sides of the screw head 19 restricts the freedom of movement of the screw 6 in the direction of its axis so far that the shoulder 20 cannot leave the elongated hole 5 in axial direction and the screw 6 cannot co-rotate when the nut 7 is unscrewed.

The distance between the flange portion 14 and tips 22 or spikes on the flange portion 13 facing it is greater than the wall thickness of the plate 1, so that the latter is easily moveable in the provisional position in the direction of its elongated hole 4 relative to the connecting unit 3.

The screw head 19 and the flange portion 14 limit a groove 23, into which the plate 2 engages. The height of the shoulder 20 in axial direction of the screw 6 is greater than the wall thickness of the plate 2, so that the plate 2 is received in the groove 23 with axial play and as a consequence of this is likewise easily moveable in the direction of its elongated hole 5 against the connecting unit 3. The freedom of movement of the plates 1, 2 against one another in the direction of their elongated holes 4, 5 is therefore the sum of the freedoms of movement of the plates 1, 2 relative to the connecting unit 3. On assembling the vehicle body, the connecting unit 3 is therefore initially brought into the provisional position of FIGS. 2 and 3 in order to ensure, when following the painting of the body during the drying the body is exposed to a high temperature of up to 200° C., a large freedom of movement of the plates 1, 2 against one another in order to securely prevent bending of the plate 1.

This high degree of freedom of movement in particular still exists even when the body following the drying has cooled down again. At this stage, the gap widths between the edges of the paneling element, to which the plate 1 belongs, and other body elements can be checked and if necessary, the position of the paneling element can be corrected.

Figure 4:
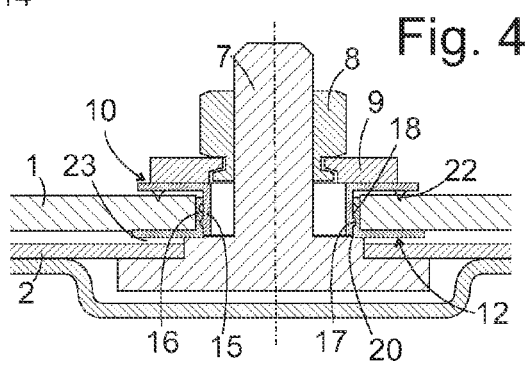
FIG. 4 a section through the connecting unit that is analogous to FIG. 2 in definitive position.

After the gap widths all around the connecting element have been correctly adjusted in this way, the nut 8 is tightened in order to permanently fix the connecting unit 3 on the plate 1. The pressure exerted by the nut 8 on the outer part 11 drives the engagement protrusion 17 out of the groove 8 and the sleeve portion 15 moves deeper into the sleeve portion 16 as shown in FIG. 4, wherein the tips 22 of the outer part 11 pierce the plate 1, thus establishing a positively joined connection between the plate 1 and the sleeve 10.

Since the inner part 12 of the sleeve 10 is supported on the shoulder 20, the groove 23 cannot narrow through the tightening of the nut 8. The engagement of the plate 2 in the groove 23 therefore retains play. As a consequence of this, the plates 1, 2 can still move against one another even in the definitive position of the connecting unit 3, however the freedom of movement is now restricted to that of the plate 2 relative to the connecting unit 3. A severe displacement of the plates 1, 2 against one another, as is still possible in the provisional position, is now excluded so that obvious changes of the gap width between the paneling element and adjacent body elements cannot occur.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A motor vehicle body comprising:
a substructure with a first heat expansion coefficient, the substructure having a first plate with a first opening formed therein;
a paneling element with a second heat expansion coefficients which is different than the first heat expansion coefficient, the paneling element having a second plate with a second opening formed therein; and
at least one connecting unit penetrating the first and second openings such that one of the plates is held in a groove of the connecting unit with play in a direction of its surface normal, wherein the connecting unit includes a bushing having two parts which are moveable against one another from a provisional position in the direction of the surface normal to a definitive position against a resistance such that the other plate is clamped therebetween.

2. The motor vehicle body according to claim 1, wherein the one plate is a metal plate and the other plate is a plastic plate.

3. The motor vehicle body according to claim 1, wherein the two parts of the bushing comprise telescopically inter-engaging sleeve portions.

4. The motor vehicle body according to claim 3, wherein one of the sleeve portions comprises an engagement protrusion and the other sleeve portion comprises a groove which is dimensioned in order to receive the engagement protrusion.

5. The motor vehicle body according to claim 4, wherein the groove is dimensioned in order to receive the engagement protrusion in the provisional position.

6. The motor vehicle body according to claim 1, wherein two parts of the bushing comprise a flange portion located opposite on both sides thereof and have at least one tip facing the other plate.

7. The motor vehicle body according to claim 6, wherein the at least one tip penetrates the other plate in the definitive position.

8. The motor vehicle body according to claim 1, wherein the connecting unit further comprises a fastener having a threaded portion which penetrates the openings of the plates and a nut engaging the threaded portion.

9. The motor vehicle body according to claim 8, wherein the groove of the connecting unit is limited by a head of the fastener and one of the parts of the sleeve.

10. The motor vehicle body according to claim 9, wherein a shoulder is formed on the head which penetrates the opening of the one plate and which the one part of the sleeve abuts.

11. The motor vehicle body according to claim 9, wherein a shoulder is formed on the head, which engages into the opening of the one plate in a rotationally fixed manner.

12. The motor vehicle body according to claim 1 wherein at least one of the first and second openings comprises an elongated hole.

* * * * *